(12) United States Patent
Klimczak et al.

(10) Patent No.: US 12,734,756 B2
(45) Date of Patent: Sep. 15, 2026

(54) APPARATUS, SYSTEM AND METHOD FOR IN-LINE ADDITIVE MANUFACTURING NOZZLE INSPECTION

(71) Applicant: 3D Print Innovations, LLC, Millburn, NJ (US)

(72) Inventors: Scott Klimczak, St. Petersburg, FL (US); Luke Rodgers, St. Petersburg, FL (US)

(73) Assignee: 3D Print Innovations, LLC

( * ) Notice: Subject to any disclaimer, the term of this patent is extended or adjusted under 35 U.S.C. 154(b) by 261 days.

(21) Appl. No.: 18/461,435

(22) Filed: Sep. 5, 2023

(65) Prior Publication Data

US 2024/0066800 A1 Feb. 29, 2024

Related U.S. Application Data

(63) Continuation of application No. 17/417,047, filed as application No. PCT/US2019/066924 on Dec. 17, 2019, now abandoned.

(Continued)

(51) Int. Cl.

*B29C 64/35* (2017.01)
*B29C 64/209* (2017.01)

(Continued)

(52) U.S. Cl.

CPC ............ *B29C 64/35* (2017.08); *B29C 64/209* (2017.08); *B29C 64/227* (2017.08); *B33Y 30/00* (2014.12); *B33Y 40/00* (2014.12)

(58) Field of Classification Search

CPC ..... B29C 64/209; B29C 64/35; B29C 64/393; B41J 2/135; B41J 2/13579; B41J 2/2142; B41J 2/125

See application file for complete search history.

(56) References Cited

U.S. PATENT DOCUMENTS 8,356,879 B1 * 1/2013 Tallada ............... B41J 2/16579 347/22
11,203,159 B2 12/2021 Ochi (Continued)

FOREIGN PATENT DOCUMENTS

JP 2000326524 A 11/2000
JP 2008096721 A * 4/2008

(Continued)

OTHER PUBLICATIONS

Machine translation JP2008096721A (Year: 2008).*

(Continued)

*Primary Examiner* — Ariella Machness
(74) *Attorney, Agent, or Firm* — Riverside Law LLP

(57) ABSTRACT

An additive manufacturing apparatus, system, and method. More particularly, the disclosed in-line nozzle inspection apparatus, system and method are suitable to monitor an additive manufacturing print nozzle, and may include: at least one sensor integrated with a motion driver for the print nozzle; a plurality of imaging lenses suitable to provide a substantially complete field of view at least about a tip of the print nozzle; and a comparative engine suitable to compare the field of view state to an acceptable state of the print nozzle, and to execute a cleaning of the print nozzle if the field of view state is unacceptable.

18 Claims, 8 Drawing Sheets

Related U.S. Application Data

(60) Provisional application No. 62/782,430, filed on Dec. 20, 2018.

(51) Int. Cl.

| | |
|---|---|
| ***B29C 64/227*** | (2017.01) |
| ***B33Y 30/00*** | (2015.01) |
| ***B33Y 40/00*** | (2020.01) |

(56) References Cited

U.S. PATENT DOCUMENTS

| | | | | |
|---|---|---|---|---|
| 2010/0009065 | A1 | 1/2010 | Sawada | |
| 2015/0321422 | A1 | 11/2015 | Boyer | |
| 2016/0250848 | A1 | 9/2016 | Clark | |
| 2018/0361672 | A1 | 12/2018 | Ochi | |
| 2020/0198234 | A1 * | 6/2020 | Kuster | B29C 64/393 |

FOREIGN PATENT DOCUMENTS

| | | | | |
|---|---|---|---|---|
| WO | WO-2010021972 | A1 * | 2/2010 | G06T 7/586 |
| WO | 2015073367 | A1 | 5/2015 | |
| WO | 2017099162 | A1 | 6/2017 | |
| WO | 2017137851 | A2 | 8/2017 | |

OTHER PUBLICATIONS

International Search Report for PCT/US2019/0066924, dated Jun. 25, 2020.

Espacenet Machine Translation (Year: 2023).

Translation of JP 2000326524 by ProQuestand Global Dossier (Year: 2022).

Opinion of the International Searching Authority for PCT/US2019/0066924, dated Jun. 25, 2020.

* cited by examiner

APPARATUS, SYSTEM AND METHOD FOR IN-LINE ADDITIVE MANUFACTURING NOZZLE INSPECTION

CROSS-REFERENCE TO RELATED APPLICATIONS

The present application claims benefit to U.S. application Ser. No. 17/417,047, filed Jun. 6, 2021, entitled: "Apparatus, System and Method for In-Line Additive Manufacturing Nozzle Inspection," which claims priority to International Application PCT/US2019/066924, filed Dec. 17, 2019, entitled: "Apparatus, System and Method for In-Line Additive Manufacturing Nozzle Inspection," which claims priority U.S. Provisional Application No. 62/782,430, filed Dec. 20, 2018, entitled: "Apparatus, System and Method for In-Line Additive Manufacturing Nozzle Inspection," the entirety of which is incorporated herein by reference as if set forth in its entirety.

BACKGROUND

Field of the Disclosure

The present disclosure relates to additive manufacturing, and, more specifically, to an apparatus, system and method for in-line additive manufacturing print nozzle inspection.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head which feeds the print material filament through a heated nozzle to print, an X-Y planar control for moving the print head in the X-Y plane, and a print platform upon which the base is printed and which moves in the Z-axis as successive layers are printed.

More particularly, the FDM printer nozzle heats the thermoplastic print filament received to a semi-liquid state, and deposits the semi-liquid thermoplastic in variably sized beads along the X-Y planar extrusion path plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic is extruded, and is heated and pushed outwardly from a heating nozzle, under the control of the X-Y and/or Z driver of a print head, onto either a print plate/platform or a previous layer of the part being produced. More specifically, the nozzle is moved about by the robotic X-Y planar adjustment of the print head in accordance with a pre-entered geometry, such as may be entered into a processor as a print plan to control the robotic movements to form the part desired.

As both the nozzle and the print environment may be heated, and the nozzle is subjected to repeated high-speed movement, non-uniform heating of the nozzle and the print material may occur. Likewise, non-uniform heating within the print nozzle itself may occur. Yet further, movement of the nozzle may, in some instances, cause printing defects, such as stringing or clumping on the nozzle tip.

All of the foregoing adverse circumstances may cause clogging of the nozzle or buildup on the nozzle. Clogging and buildup may have significant adverse effects on a print run, may fall into the print build, or may force the cessation of a printing altogether.

Notwithstanding the aforementioned adverse effects of nozzle clogging or buildup on a print run, most FDM printers do not clean the print tip, in spite of the high likelihood of clogging and/or occluding, for the reasons discussed throughout, during particular types of print runs. Of course, a few industrial printers do run a tip cleaning routine at predetermined intervals in an effort to clear any buildup of debris from the print nozzle tip. However, these limited solutions are very time consuming (up to 50% of processing time in many cases), and suffer from being open loop processes. The open loop nature of such processes disadvantageously allows for the buildup of debris on the print nozzle between the open-loop selected cleaning intervals.

The material that may build up on the nozzle tip is obviously exposed to the nozzle temperature for a long duration, and thus, in addition to clogging, may burn, which further impedes the expected nozzle flow rate. During nozzle movement on the same layer, in which the nozzle is to stop printing and then restart after the movement, this nozzle buildup may ooze, or cause unintended print ooze, from the nozzle. The foregoing may add to the mis-formation of a layer, a feature, and/or stringing that are detrimental effects of print nozzle buildup and clogging.

SUMMARY

An additive manufacturing apparatus, system, and method are disclosed. More particularly, the disclosed in-line nozzle inspection apparatus, system and method are suitable to monitor an additive manufacturing print nozzle, and may include: at least one sensor integrated with a motion driver for the print nozzle; a plurality of imaging lenses suitable to provide a substantially complete field of view at least about a tip of the print nozzle; and a comparative engine suitable to compare the field of view state to an acceptable state of the print nozzle, and to execute a cleaning of the print nozzle if the field of view state is unacceptable.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
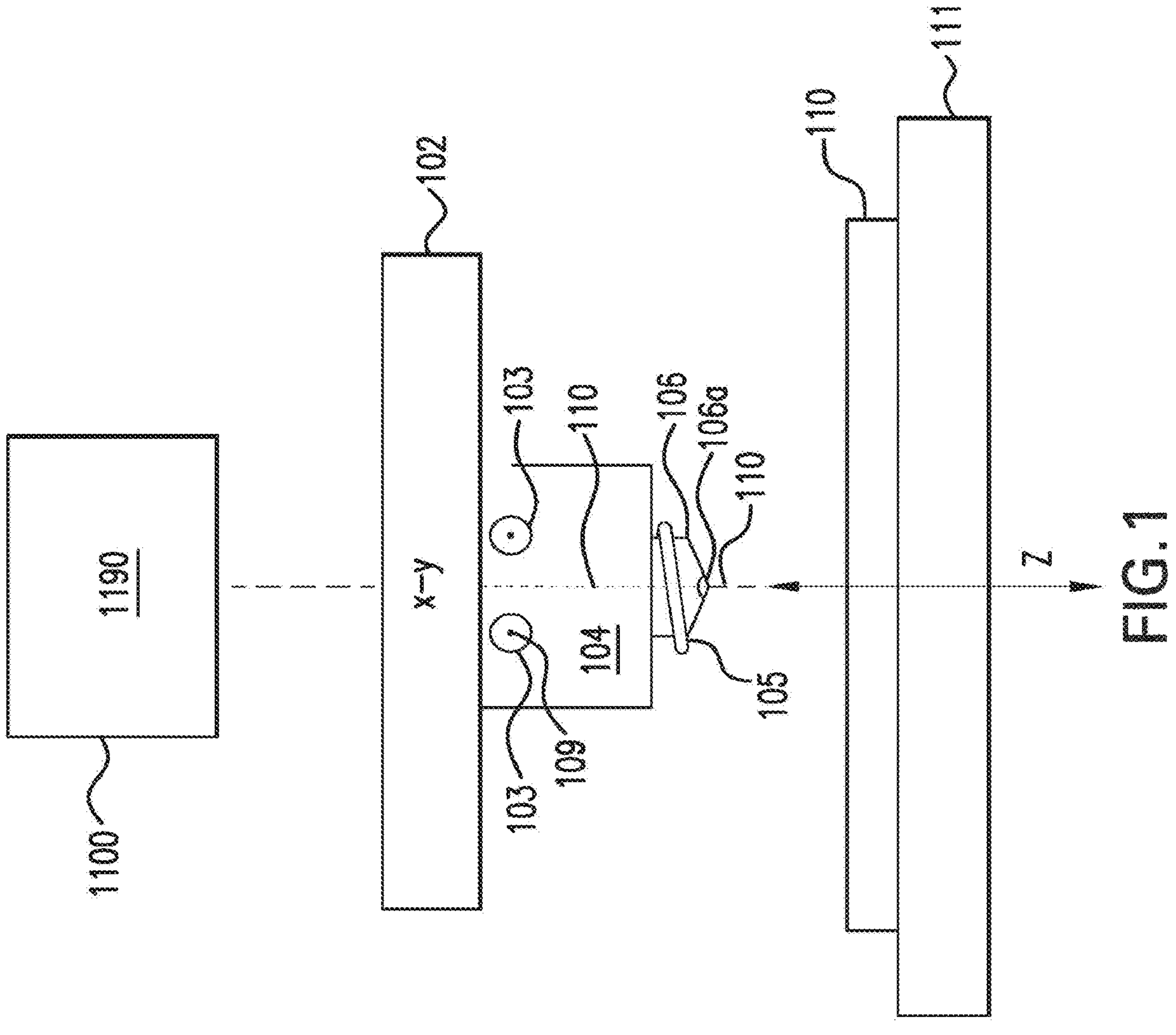
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being “on”, “engaged to”, “connected to” or “coupled to” another element or layer, it may be directly on, engaged, connected or coupled to the other element or layer, or intervening elements or layers may be present, unless clearly indicated otherwise. In contrast, when an element is referred to as being “directly on,” “directly engaged to”, “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). Further, as used herein the term “and/or” includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the embodiments.

FIG. 1 is a block diagram illustrating an exemplary filament-based printer 100. In the illustration, the printer includes an X-Y axis driver 102 suitable to move the print head 104, and thus the print nozzle 106 on the print head 104, in a two dimensional plane, i.e., along the X and Y axes, responsive to the print plan 1190. Further included in the printer 100 for additive manufacturing are the aforementioned print head 104, including print nozzle 106.

As is evident from FIG. 1, printing may occur upon the flow of heated print material outwardly from the nozzle 106 along a Z axis with respect to the X-Y planar movement of the X-Y driver 102. Thereby, layers of printed material 110 may be provided from the nozzle 106 onto the print build plate 111 along a path dictated by the X-Y driver 102.

More particularly, filament-based 3D printers include an extruding print head 104 that uses the hobs 103 to move the filament 110 into the heated nozzle 106, i.e., past heater 105 about nozzle 106, at a feed rate tied to the controller 1100 executing the print plan algorithm 1190 via the X-Y-Z axis driver 102. A motor 109 is generally used to drive at least one of the hobs 103, such as against an undriven one of the hobs 103. This extrusion and X-Y-Z movements are made responsive to the print plan 1190 executed by controller 1100, and are herein included in the additive manufacturing kinematics.

Figure 2:
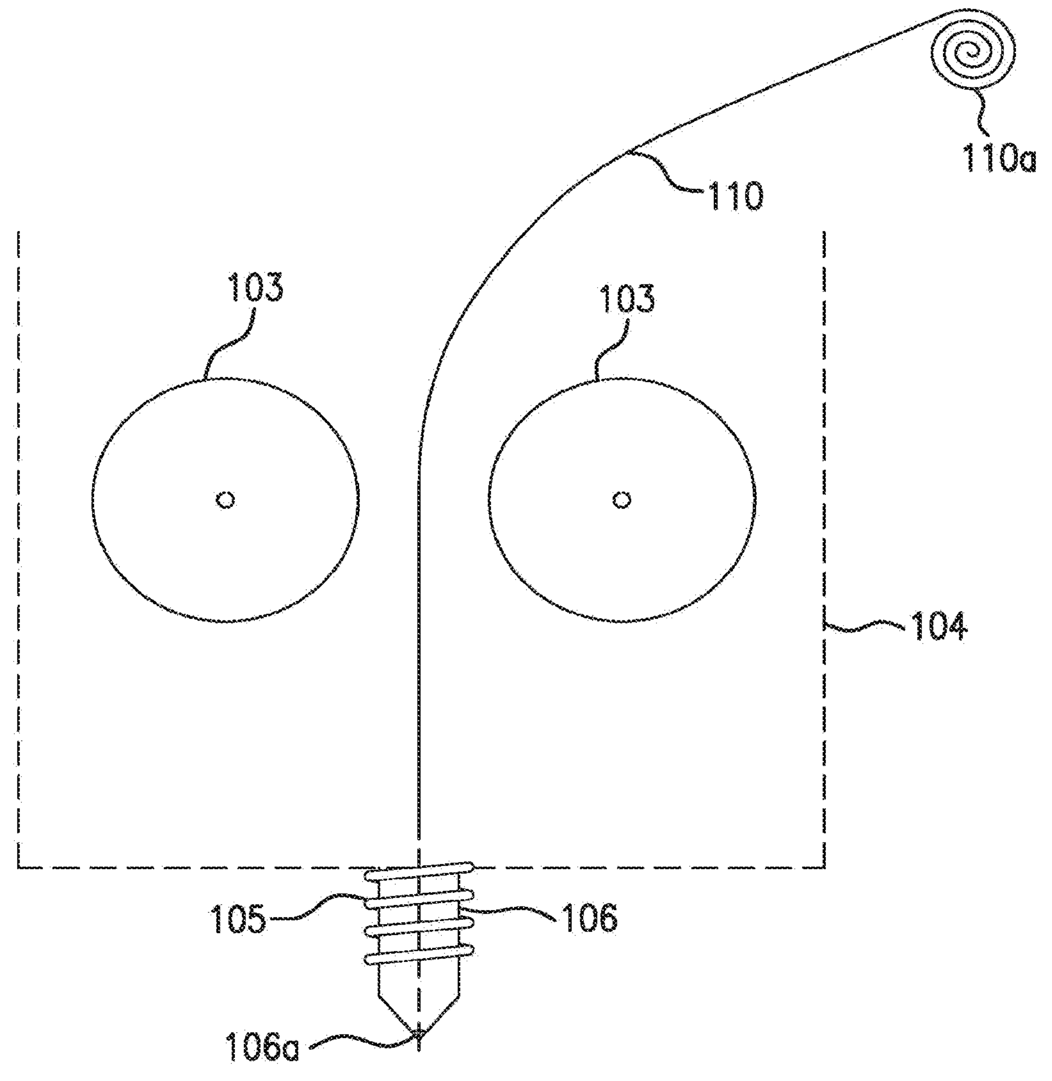
FIG. 2 is an illustration of an exemplary additive manufacturing system.

FIG. 2 illustrates with greater particularity a print head 104 having nozzle 106 for an exemplary additive manufacturing device, such as a 3-D printer, such as a FDM printer. As illustrated, the print material 110 is extruded via hobs 103 of the head 104 from a spool of print material 110*a* into and through the heated nozzle 106, and thus past heater 105, responsively to print plan 1190. More particularly, as the nozzle 106 heats the print material 110, the print material is at least partially liquefied for output from an end port/tip 106*a* of the nozzle at a point along the nozzle distal from the print head 104 onto the print build 111. Thereby, the extruded material is “printed” outwardly from the port 106*a* via the Z axis along a X-Y planar path determined by the X-Y driver (see FIG. 1) connectively associated with the print head 104.

The embodiments optimize the timing of nozzle tip cleaning, such that the cleaning occurs when needed, but does not take up significant amounts of process time. The foregoing may be accomplished using various different methodologies.

For example, an upward mounted process camera may be placed near a tip cleaning station. Thereby, when a cleaning algorithm implemented by the overall processing system instructs a cleaning of the nozzle tip 106*a*, rather than cleaning the nozzle, the nozzle tip 106*a* may be moved over the upward looking camera to allow for a vision inspection of the nozzle tip. If the nozzle evidences a need for cleaning, the algorithm instructs the implementation of a cleaning, and, if no need for cleaning is evidenced, printing resumes. The aforementioned embodiment saves the cycle time of tip cleaning when such cleaning is unnecessary. However, to the extent the need for cleaning arises between inspection cycle times, the foregoing embodiment may miss the existence of the need until the next inspection cycle occurs.

Figure 3:
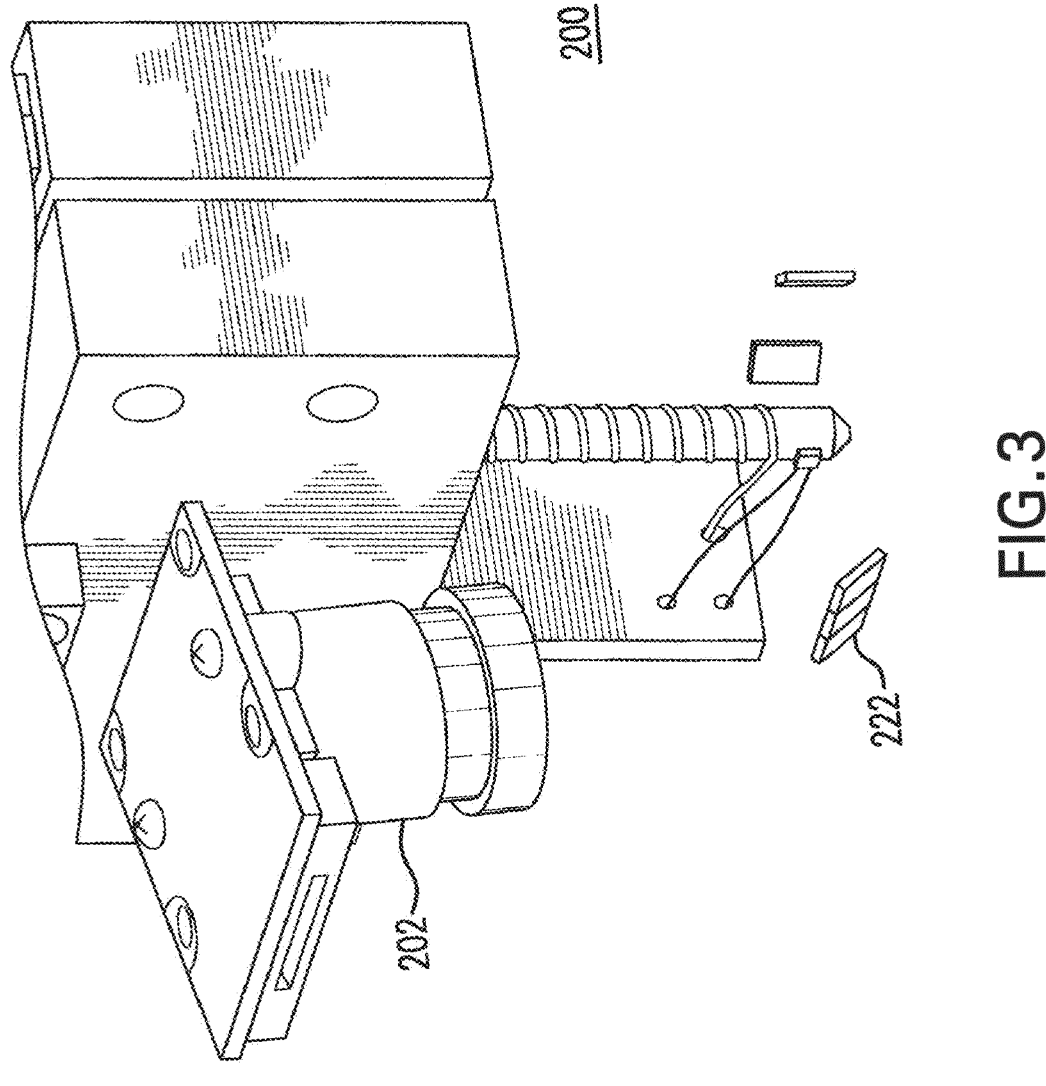
FIG. 3 illustrates an in-line print nozzle inspection system.

In an additional embodiment, and as illustrated in FIG. 3, an in-line inspection system 200 may include an inspection tool 202, such as a camera, integrated onto the print nozzle system, which is used, at least in part, to elect when the print nozzle 106 is moved to a cleaning station 222, such as by the X-Y driver 102. By way of example, the camera 202 may be integrated on the X-Y driver 102, such that the nozzle 106/nozzle tip 106*a* may be subject to continuous/real time or substantially continuous/real time monitoring by the camera 202 as instructed by print process algorithm 1190.

In short, algorithm 1190 may include a machine vision algorithm 1190*a* to be executed by process controller 1100. Machine vision 1190*a* enables controller 1100 to actuate and monitor the camera 202 to inspect, evaluate and identify the need to clean the nozzle tip 106*a* as evidenced in still or moving images. The machine vision 1190*a* may, in conjunction with camera 202 and controller 1100, provide automatic image capturing, evaluation and processing capabilities.

Figure 4A:
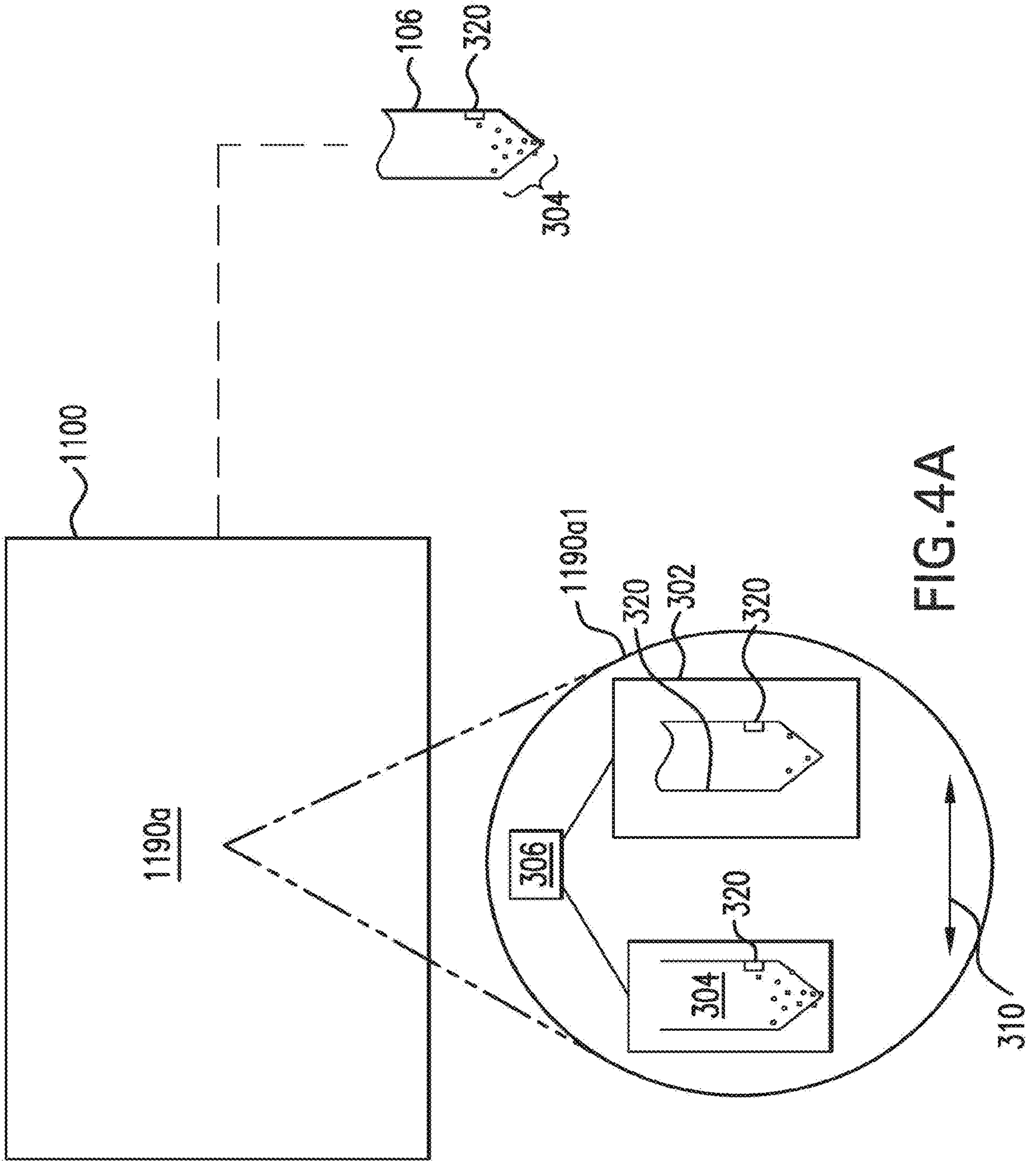
FIG. 4A illustrates exemplary machine vision algorithms.

Two principle methodologies of machine vision algorithm 1190*a* may be effectuated pursuant to the embodiments. As illustrated in FIG. 4A, subtractive visioning 1190*a*-1 may compare an average or optimal "template" vision 302 of the tip to the current vision 304 of the tip. An optimal or maximum variance 306 between the compared images may be preset in algorithm 1190*a*-1, and, when the template vision 302 is subtracted from the current vision 304, a variance in excess of the predetermined maximum allowable variance 306 is indicative of a need to clean the tip, i.e., in such a case, the variance in the images is indicative of clogging or buildup at the nozzle tip.

In conjunction with subtractive visioning, image alignment 310 may be performed by visioning algorithm 1190*a*-1. That is, a "key" 320 may be located and aligned as between the template image 302 and the current image 304, such that the comparison of the images may be performed at a precise location and angle. In short, the template and the current images may be algorithmically moved/rotated by algorithm 1190*a* to precisely fit the two images atop one another to allow for the subtraction on, for example, a pixel-by-pixel basis.

Figure 4B:
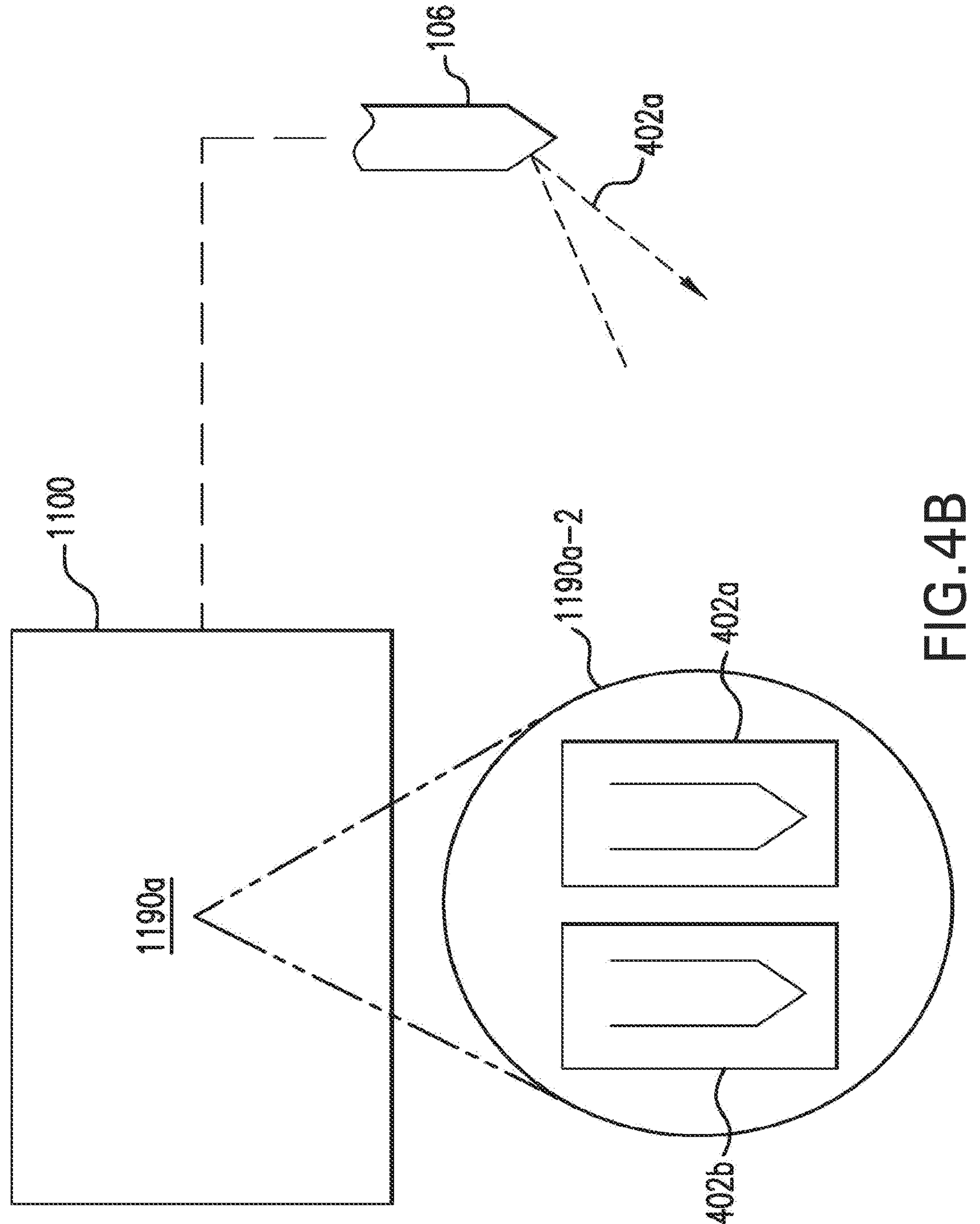
FIG. 4B illustrates additional exemplary machine vision algorithms.

Additionally and alternatively, feature visioning 1190*a*-2 may be employed, as illustrated in FIG. 4B. In this methodology 1190*a*-2, only certain measurements 402*a* or features from a current image 304 are compared with the same specific features or measurements 402*b* in a known acceptable nozzle tip vision. By way of example, only reflectivity or color 402*a* of aspects of the nozzle tip may be compared using this methodology to assess a need for nozzle tip cleaning.

Accordingly, feature visioning may be employed without the need for alignment referenced above in subtractive visioning. However, it should be noted that, contrary to subtractive visioning, feature visioning may not allow for a pinpointing of the location on the nozzle tip of the buildup or clog, but such a pinpointing may be unnecessary if an overall cleaning is to be executed by the cleaning algorithm 1190*a* regardless of the location of the clog/buildup once the nozzle exceeds the allowed variance.

In accordance with the foregoing embodiments, the time delay between a tip issue arising, and detection of that tip issue, may be minimal. That is, the sensing of a tip issue may occur in real time/substantially real time. Thus, the execution of a tip cleaning may also occur substantially contemporaneously with the occurrence of a tip issue.

Figure 5A:
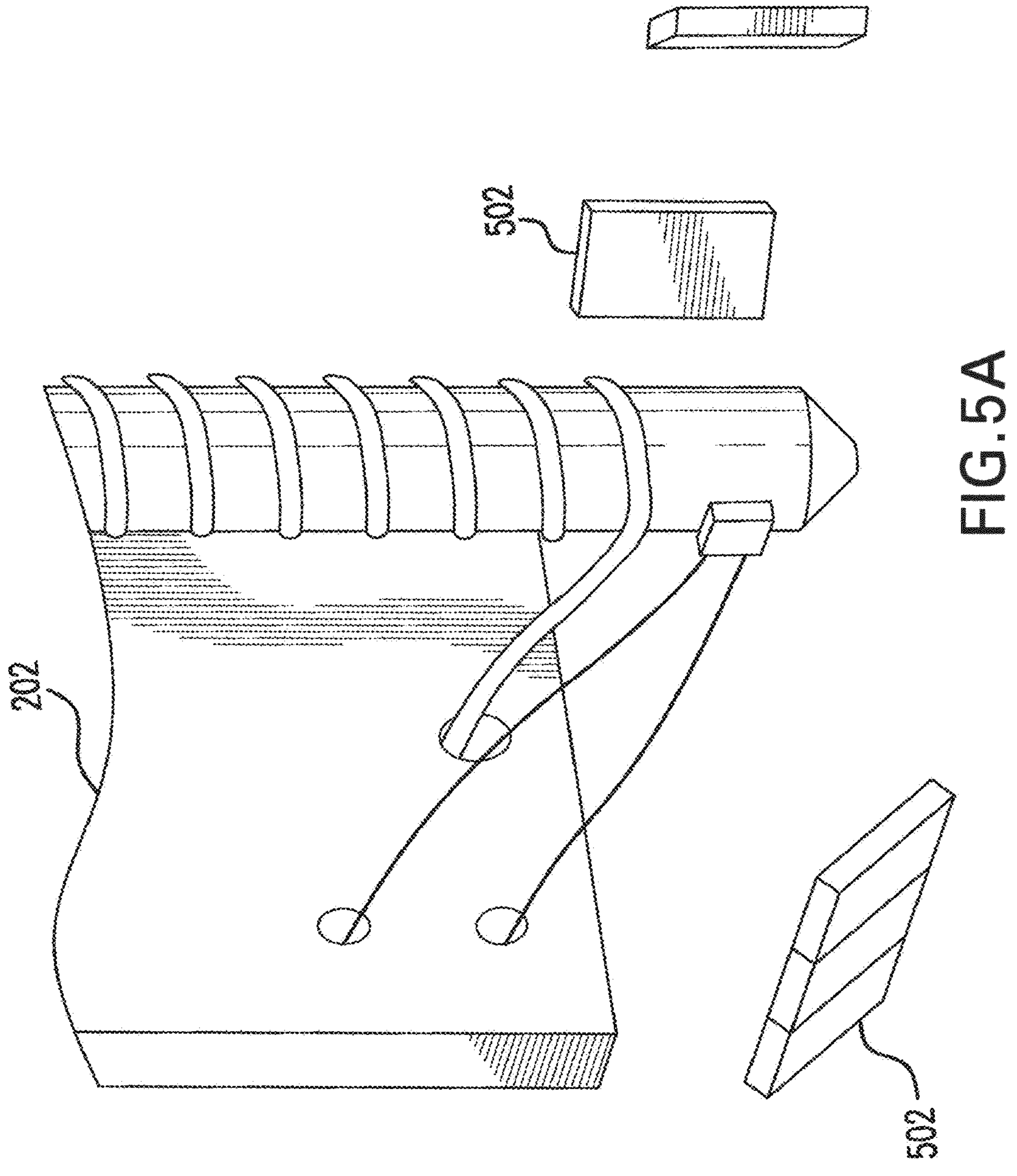
FIG. 5A illustrates exemplary features of lensing systems for an in-line print nozzle inspection system.
Figure 5B:
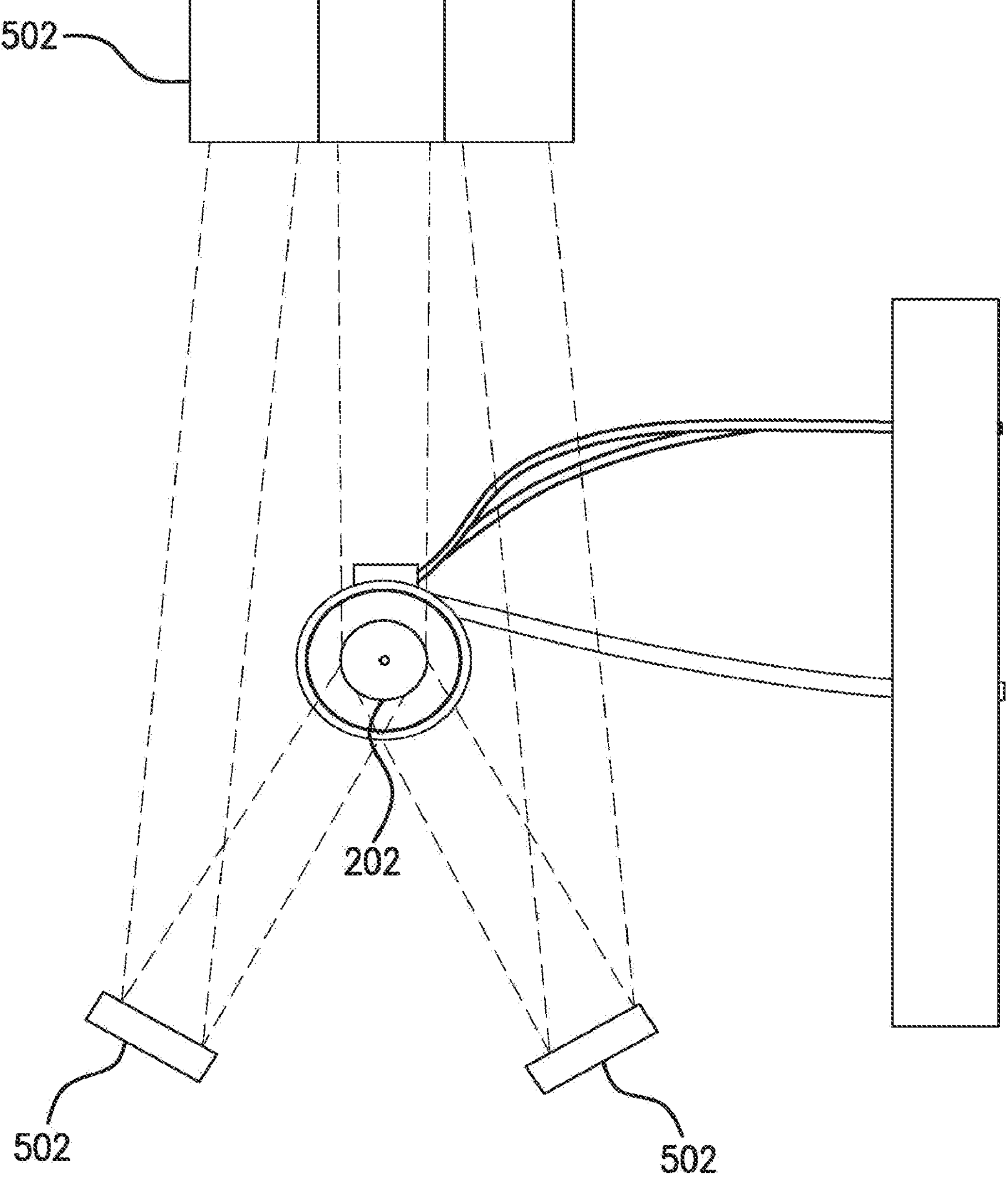
FIG. 5B illustrates additional exemplary features of lensing systems for an in-line print nozzle inspection.

More specifically, FIGS. 5A and 5B illustrate an exemplary hardware layout suitable to enable the real time nozzle tip sensing discussed above in FIG. 3, and the application of the algorithms 1190*a* to enable real time nozzle cleaning as discussed in FIGS. 4A and 4B. As illustrated in FIGS. 5A and 5B, one or more lensing systems 502 may enable the sensing of one or more aspects of the nozzle by a single sensor/camera 202.

In FIG. 5A, a 3-way reflective lensing system 502 allows for the viewing of all portions of a nozzle by a single camera 202, such as may be mounted on the X-Y print head driver 102 as referenced above. More specifically, a main reflector lens 504 may include three dedicated reflective features, one to provide a primary reflection 504*a* from an aspect of the nozzle, and at least two other reflective lens portions 504*b*, *c* to receive a primary reflection from other reflective lenses 506 such that two secondary reflections may be provided to the camera 202, and thereby a 360 degree view of the nozzle may be provided to the camera 202 by lensing system 502. The reflectors may be known lenses or mirrors, polished metallic reflectors, or the like. FIG. 5B more clearly illustrates the 360 degree field of view provided in accordance with the exemplary embodiment of FIG. 5A.

Thus, although the varying views provided in the embodiments above may have differing perspective geometries, the use of subtractive or feature visioning may allow that exact dimensioning or image scaling is not critical, although the visioning algorithm 1190*a* may require knowledge of relevant angles/distances of the lensing system used.

It should additionally be noted that the lensing and imaging systems discussed herein throughout are inherently present within the print environment in ones of the disclosed embodiments. As such, and because temperatures within a print build area may reach or exceed 200 degrees C., the disclosed sensing and lensing hardware in the build area must be suitable to survive and operate at such typical build area temperatures.

Figure 6:
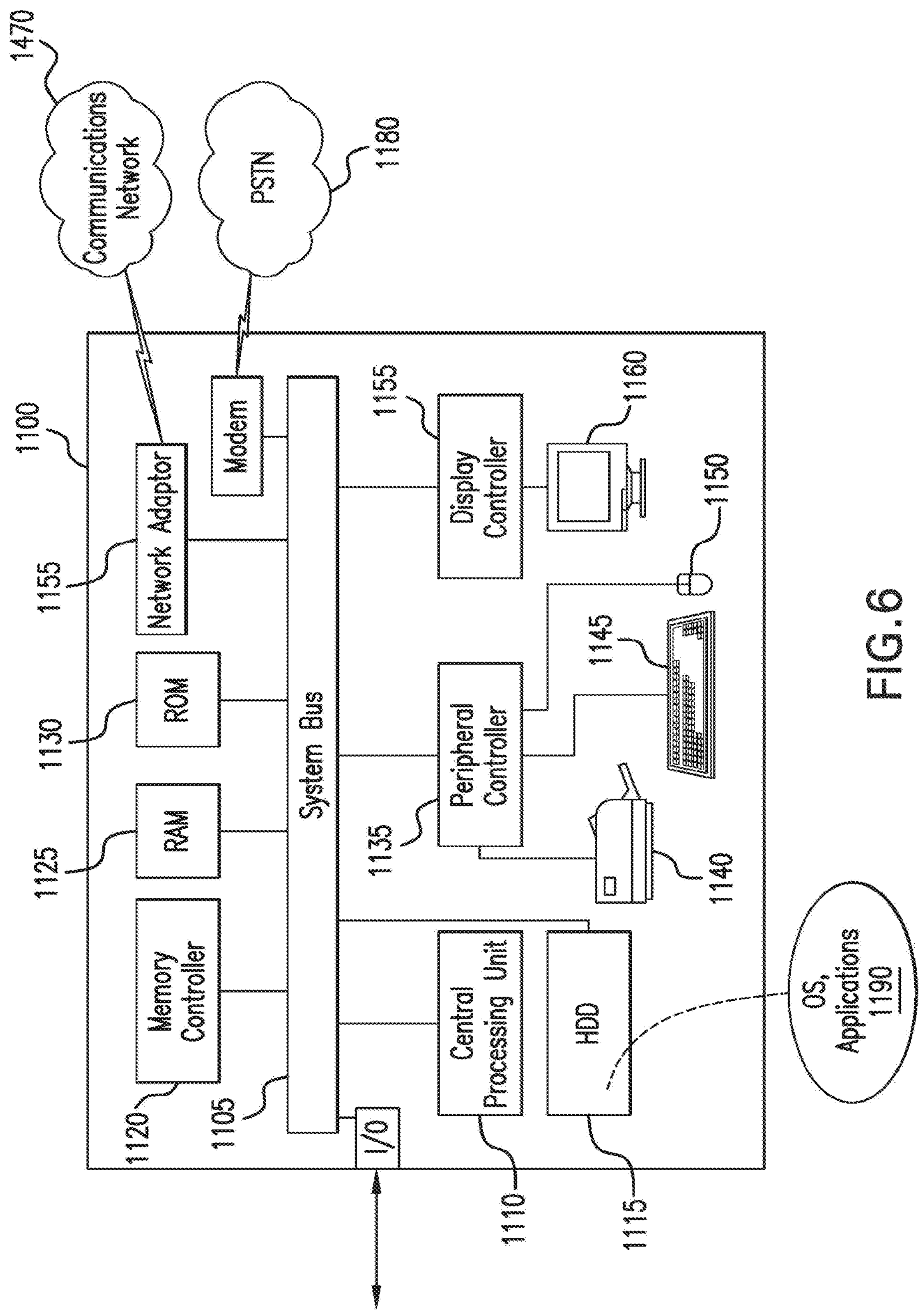
FIG. 6 illustrates an exemplary computing system.

FIG. 6 depicts an exemplary computing system 1100 for use as the controller 1100 in association with the herein described systems and methods. Computing system 1100 is capable of executing software, such as an operating system (OS) and/or one or more computing applications/algorithms 1190, such as applications/algorithms including and applying the print plan and the nozzle inspection/cleaning algorithms 1190*a* discussed herein throughout.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An in-line nozzle inspection system suitable to monitor an additive manufacturing print nozzle, comprising:

at least one sensor integrated with a motion driver for the print nozzle;

a plurality of imaging lenses comprising:

two indirect reflective lenses on a first side of the print nozzle; and three direct reflective lens portions on an opposing side of the print nozzle, wherein the three direct reflective lens portions align with the at least one sensor, the three direct reflective lens portions comprising:

an outer two of the direct reflective lens portions that are aligned with the two indirect reflective lenses;

the plurality of imaging lenses configured to provide a substantially complete 360-degree field of view at least about a tip of the print nozzle to the at least one sensor; and a comparative engine suitable to compare the field of view state received by the at least one sensor to a clean state of the print nozzle, and to execute a cleaning of the print nozzle if the field of view comparison indicates an unclean state of the print nozzle.

2. The in-line nozzle inspection system of claim 1, wherein the at least one sensor comprises at least one camera.

3. The in-line nozzle inspection system of claim 1, wherein at least one of the sensors comprises an optical sensor.

4. The in-line nozzle inspection system of claim 1, wherein integration of the at least one sensor with the motion driver comprises a physical mount.

5. The in-line nozzle inspection system of claim 1, wherein the field of view of the print nozzle comprises a field of view solely of the tip of the print nozzle.

6. The in-line nozzle inspection system of claim 1, wherein an acceptable state comprises a template image.

7. The in-line nozzle inspection system of claim 6, wherein the comparison comprises a subtractive comparison to the template image.

8. The in-line nozzle inspection system of claim 7, wherein the subtractive comparison comprises a maximum variance from the template image.

9. The in-line nozzle inspection system of claim 7, wherein the subtractive comparison comprises an optimum variance from the template image.

10. The in-line nozzle inspection system of claim 1, wherein the clean state comprises a feature characteristic of the print nozzle.

11. The in-line nozzle inspection system of claim 1, wherein the comparison comprises a feature characteristic comparison.

12. The in-line nozzle inspection system of claim 1, further comprising a cleaning station.

13. The in-line nozzle inspection system of claim 12, wherein the execution of the cleaning comprises a movement by the motion driver of the print nozzle into the cleaning station.

14. The in-line nozzle inspection system of claim 12, wherein the cleaning station cleans clogs of the print nozzle.

15. The in-line nozzle inspection system of claim 12, wherein the cleaning station cleans buildup from the print nozzle.

16. The in-line nozzle inspection system of claim 1, wherein the print nozzle comprises a fused deposition modelling print nozzle.

17. The in-line nozzle inspection system of claim 1, wherein the motion driver operates in three axes.

18. The in-line nozzle inspection system of claim 1, wherein the field of view comprises all portions of the nozzle.

* * * * *